United States Patent [19]
Johnson

[11] 4,152,932
[45] May 8, 1979

[54] FUEL INJECTION VALVES AND THEIR MANUFACTURE

[76] Inventor: Lloyd E. Johnson, 700 Highview Rd., East Peoria, Ill. 61611

[21] Appl. No.: 878,271

[22] Filed: Feb. 16, 1978

Related U.S. Application Data

[62] Division of Ser. No. 597,424, Jul. 21, 1975, abandoned.

[51] Int. Cl.$^2$ .................................................. G01M 19/00
[52] U.S. Cl. ................................................ 73/168; 29/705
[58] Field of Search ...................... 73/3, 4, 168, 119 A; 29/705

[56] References Cited

U.S. PATENT DOCUMENTS

| | | | |
|---|---|---|---|
| 2,691,299 | 10/1954 | Ward | 73/168 |
| 3,097,516 | 7/1963 | Reed et al. | 73/4 R |

FOREIGN PATENT DOCUMENTS

| | | | |
|---|---|---|---|
| 604912 | 5/1960 | Italy | 73/168 |

*Primary Examiner*—S. Clement Swisher
*Attorney, Agent, or Firm*—Darbo & Vandenburgh

[57] ABSTRACT

A fixture and method is disclosed for assembling and standardizing embodiments of fuel injection valves of the outward opening type and in particular those valves having a retainer connection between the stem of the valve closure and the compression spring urging the closure to its seated position which permits the stem to rock with respect to the end of the spring. The retainer connection is formed of one or more members of selectable thickness, or having a selectable stop ring height, wherein by use of the fixture a plurality of valves can be manufactured having substantially identical flow rate characteristics. A subassembly comprising the valve body, valve spring and valve closure are held in the fixture and a specified assembled load is applied to the spring. Measurements are made leading to a determination of the thickness to be employed for said member(s) to be assembled in that valve.

11 Claims, 9 Drawing Figures

U.S. Patent  May 8, 1979  Sheet 1 of 3  4,152,932
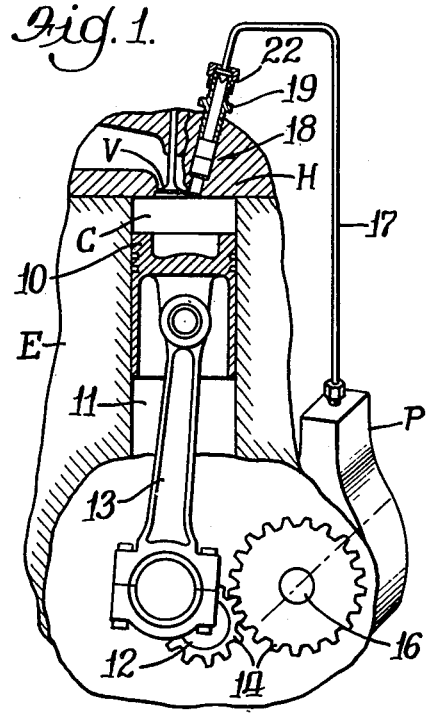
Fig. 1.
Fig. 3.
Fig. 4.
Fig. 5.
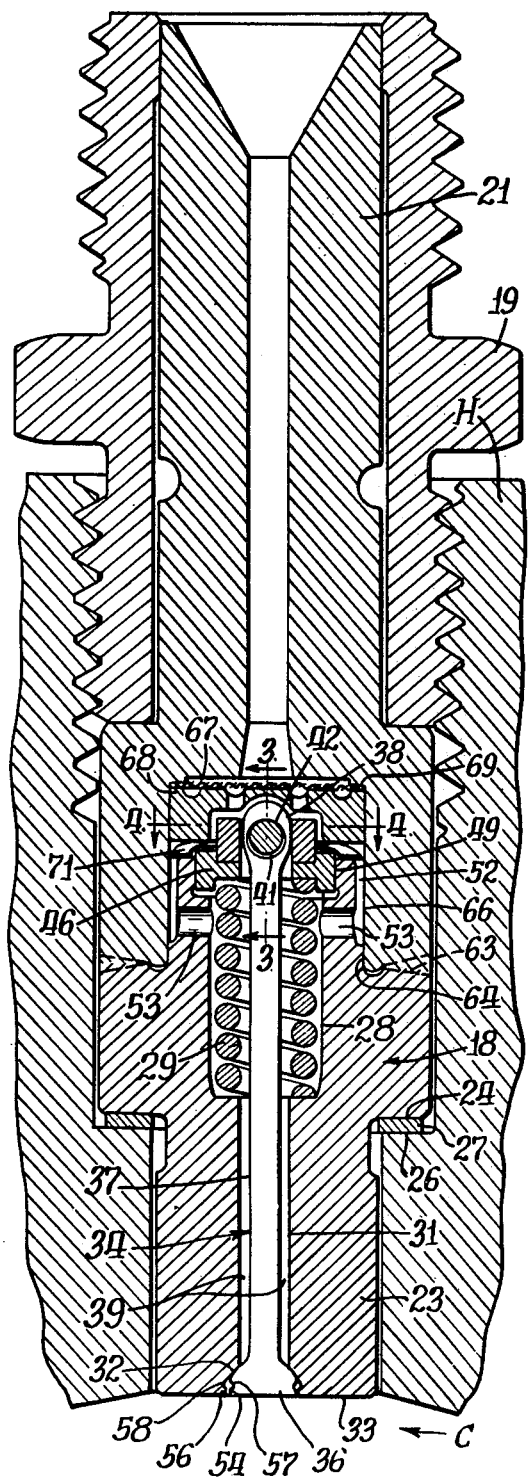
Fig. 2.

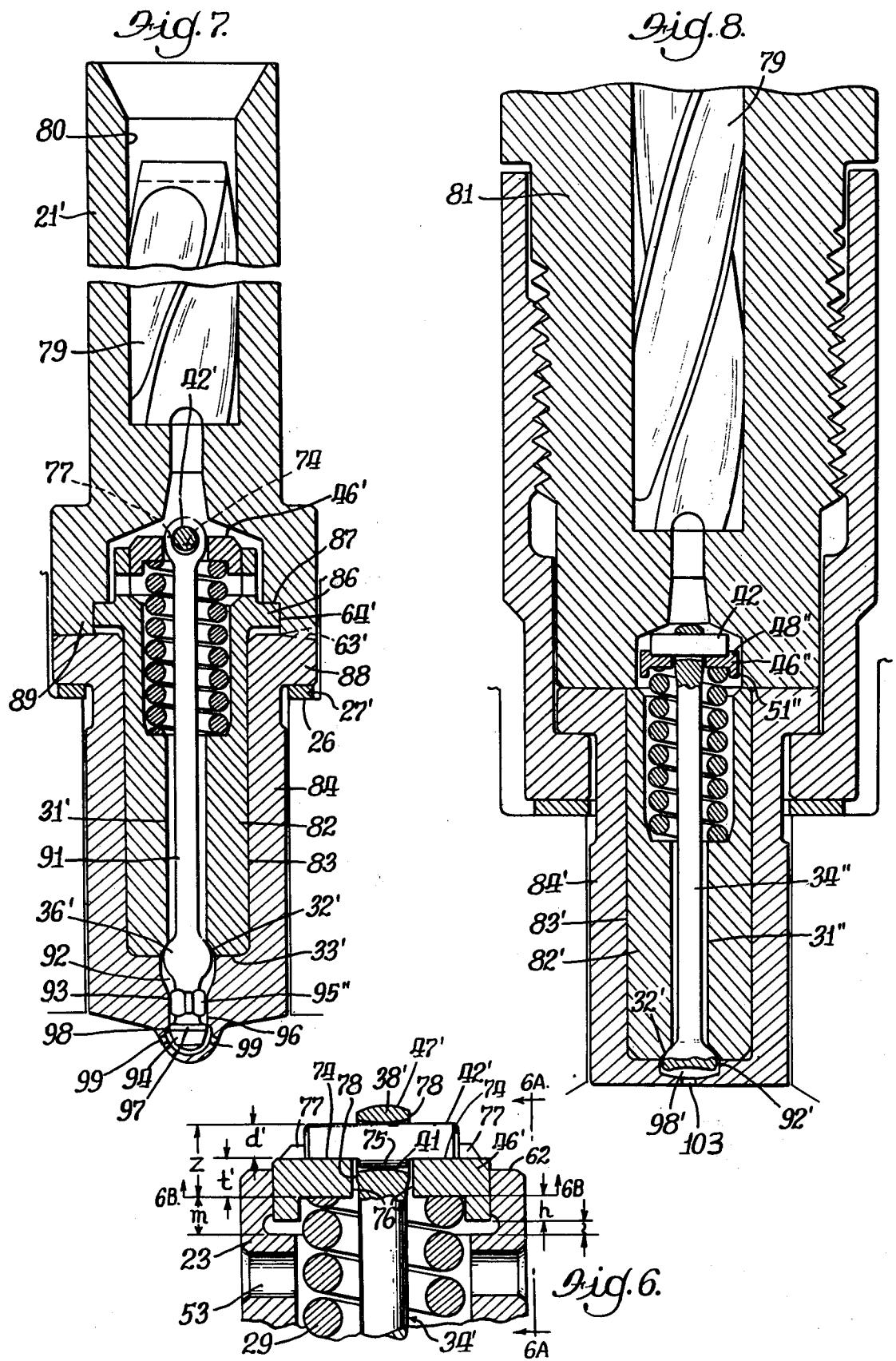

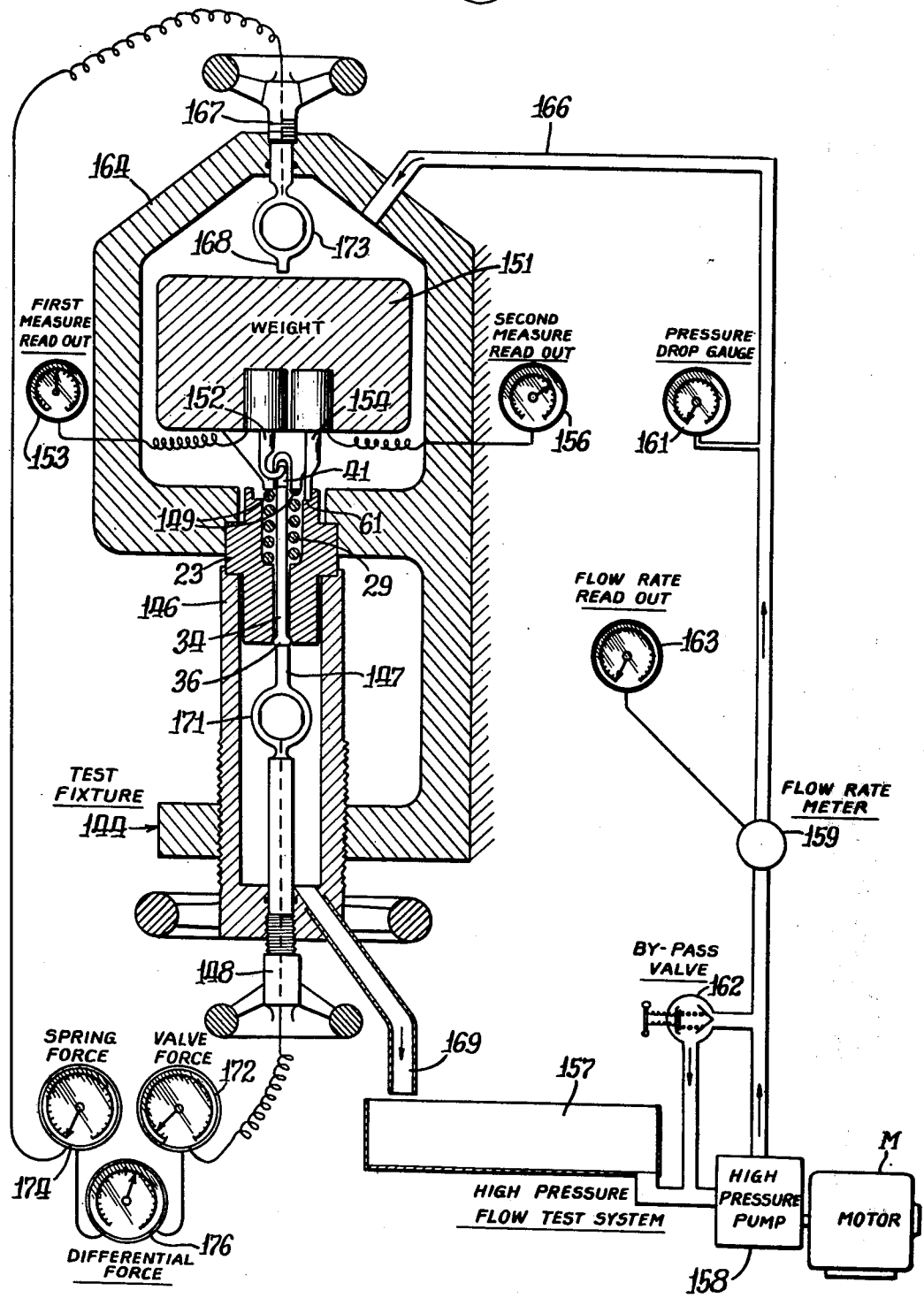

FUEL INJECTION VALVES AND THEIR MANUFACTURE

RELATED APPLICATION

This application is a division of my pending application Ser. No. 597,424, filed July 21, 1975 now abandoned.

BACKGROUND AND SUMMARY OF THE INVENTION

High speed diesel engines, particularly those used to power vehicles, are required to operate efficiently and with low emissions over a wide range of loads and engine speeds. They are expected to operate smoothly and cleanly at low idle speed conditions with a very small quantity of fuel injected into each cylinder each cycle. The same engines are also expected to run cleanly and efficiently at several thousand injections per minute with large enough quantities of fuel delivered at each injection cycle to utilize air charges at high density as supplied by turbochargers.

To achieve acceptable performance and emission standards, each fuel injection valve on such engines must be not only highly responsive but as identical in delivery characteristics to others of its set as is economically feasible.

Compact injection valve designs suitable for diesel engines employ helical compression springs made of high strength wire having a high modulus of elasticity in torsion. Such springs are needed to provide high unseating force and high spring rate in small size so they can be fitted in a limited space and hot environment with required reliability.

Such is the state of the art in spring design and manufacturing processes that compression springs cannot be made in quantity at reasonable cost with uniformly parallel ends. Even more difficult to produce are springs whose ends will remain parallel without external restraint when compressed by on-axis forces. Furthermore, variations are sizable in coil diameter, in length unassembled, in exact number of active coils and in tightness of closure of end coils when made by the best production methods. Means must be provided for adjustment of the length of springs as assembled if the assembled load is to be accurately controlled. The rate at which springs deflect for added increments of load also vary appreciably between individual springs out of a production run.

Another requirement is economy of servicing. The servicing cost will be low if the parts likely to require replacement are low in cost but only if little or no skilled labor is required to replace them. A fixture and method for assembling and standardizing embodiments of fuel injection valves for internal combustion engines and more particularly to compact, highly responsive injection valves with the high uniformity of characteristics required for use in high speed diesel engines for use in applications requiring high performance and compliance with stringent emission regulations. This invention is also particularly applicable applicable to fuel injection valves employing highly compact compression springs of helically coiled high strength wire located close to the movable valve to provide the force needed to hold the valve on its seat between injections. Such a spring is highly stressed and should be very stiff for its size to enable it to move the valve with high responsiveness to pressure changes.

The fixture is for use in combination with an embodiment of valve which includes a load transmitting connection between one end of the compression spring and the movable valve that allows that end of the spring to tip relative to the valve by rolling, not sliding, of one loaded surface on another. One surface is a central portion of one side of a cylindrical hole through the center line of the valve member adjacent the free end of the spring. The other surface is on the surface of a hardened steel pin of smaller diameter than the opening in the valve member through which it is inserted for load bearing contact. The pin acts as a beam with its outer ends loaded by the force of the compressed spring.

Other embodiments of the valve utilize the tendency of a ball held axially in a high velocity fluid stream to stay centered in that stream to center the head end of an outward opening check valve within an orifice opening concentric with the centerline of the valve head when seated. With the valve head so centered when lifted from its seat, a symmetrical annular orifice of controlled restriction is formed.

Another objective is to provide a method for adjusting the assembled spring load in an outward opening valve assembly by determining the total thickness of means to be selected for assembly between the spring end and a side of the pin opening in the valve.

Also, for the outward opening valve requiring a lift stop, an objective is to provide a method for determining how far the check and spring end should move to provide an opening area around the check with a specified delivery rate capability. This method includes determination of the height of a stop surface on parts to be assembled between the spring end and pin opening for production uniformity in flow rate characteristics at such lift.

DESCRIPTION OF THE DRAWINGS

FIG. 1 schematically shows the general location and connection of the fuel injection valve to an internal combustion engine;

FIG. 2 shows a cross-section of a complete fuel injection valve of the outward opening type showing a preferred form of this invention drawn at several times actual size;

FIG. 3 shows a cross-section through plane 3—3 of FIG. 2 showing the preferred form of retainer and stop in another plane and further enlarged in scale;

FIG. 4 is a plan view of a filter spring for holding the fuel strainer in place, as viewed from 4—4 in FIG. 2;

FIG. 5 is a side view of the filter spring as seen from line 5—5 of FIG. 4;

FIG. 6 is of an alternative form of retainer shown in the same plane and scale as FIG. 3;

FIG. 7 is a cross-section of a complete outward opening fuel injection valve showing an alternative form of filter and a tip with multiple orifice directed at an angle from the valve center line and showing an extended check valve head with a tip sealing skirt;

FIG. 8 is a longitudinal section through another construction of outward opening injection valve with a single orifice and conventionally assembled holder; and FIG. 9 shows semi-schematically the test equipment used in determining thickness of selected parts to be assembled in outward opening fuel injection valves.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

FIG. 1 is a schematic representation of a conventional internal combustion engine with its accessory fuel injection system including a fuel injection valve according to one form of this invention. Engine E includes a cylinder head H with an air inlet valve V in conventional arrangement. Piston 10 reciprocates in cylinder 11 a part of which is the combustion chamber C. Piston 10 is in driving connection with crankshaft 12 by means of connecting rod 13. Through gear train 14, drive shaft 16 is rotated in appropriate manner to actuate fuel injection pump P. Fuel is delivered at high pressure from pump P through fuel injection line 17 to fuel injection valve generally 18 held in head H by line fitting 19. Fuel line 17 is attached in sealed connection with valve holder means 21 of fuel injection valve 18 by line nut 22.

FIG. 2 shows in section a fuel injection valve 18 of the outwardly opening type. In this embodiment the valve body 23 has an integral mounting shoulder 24 which seals on seat 26 of head H with the assistance of gasket 27. Within body 23 is a cylindrical spring chamber 28 containing helical compression spring 29. A central cylindrical passage 31 leads from spring chamber 28 to a conical seat surface 32 near the combustion chamber end 33 of body 23. A check valve member generally 34 fits inside the valve body 23. The valve member has a hemispherically formed head portion or valve closure 36 proportioned to fit tightly enough in normal valve-closed position on seat surface 32 to prevent flow of fluids in or out of the valve assembly. Stem section 37 of valve member 34 connects head 36 to a retainer portion 38. Stem 37 is appreciably smaller in diameter than passage 31 to provide adequate annular passage area 39 for flow of fuel during injection. For spring 29 to hold the valve closed tightly between injections it must be compressed at its free end 40 by retainer means attached to the check valve 34.

A hardened steel pin 42 having a diameter definitely smaller than that of pin opening 41 bears on the valve member within the pin opening in a manner similar to a roller in a hoop. A relatively small clearance between the pin and check can accommodate, by rolling, the slight angle by which the end of the spring may tip out of parallel in a plane perpendicular to the pin axis during opening motion of the valve.

FIG. 3 shows a cross-section of the retainer portion turned 90° from FIG. 2. The pin 42 is carried in transverse cylindrical openings in a collar 43 which surrounds retainer end 38 of the check. Collar 43 lays within a cylindrical recess 44 in the surface of retainer member 46 which bears on free end 40 of spring 29. Pin 42 is slightly shorter than the diameter of recess 44. The recess is sufficiently deep so that retainer 46 extends over both ends of pin 42 to keep the pin secure within the collar.

As also is shown in FIG. 3, both ends of the cylindrical pin openings 41 in the retainer portion 38 of the valve member are slightly enlarged into very narrow angle cones 45 thereby shortening the actual length of bearing of the pin within the retainer portion of the valve to a small center section "S".

The distance between the plane of the end 40 of spring 29 and the loaded surface "S" of the valve member at pin opening 41 must be separated by some distance "Z" when the valve member is in seated, closed position and spring 29 is compressed by a predetermined assembled load force. Pin dimension "d", collar thickness "w" and retainer thickness "t" are all selectable to result in a combination total thickness "Z" as required by any individual combustion of spring seat and valve members.

To provide positive centering of the retainer portion 38 of the outward opening valve, retainer 46 has a cylindrical outer surface 48 fitted in sliding but guided relationship in an inner cylindrical wall 49 near the end of valve body 23. A pilot ring 51 integral with retainer 46 serves to center the free end 40 of spring 29 in the retainer. When the retainer is fitted in the valve body, a fuel flow path through or around the retainer is needed. A clearance space 52 around the outside of the guide portion of the valve body 23 and inside the valve holder means 21 allows fuel to flow to the openings 53 located below the guide wall 49.

The hemispherical surface of the head portion 36 of the outward opening valve of FIG. 2 forms both a seating surface and the inner surface 54 of an annular discharge orifice of restricted area. The seat end of valve body 23 has an inner cylindrical surface 56 concentric with conical seat surface 32, surface 56 forming the outer boundary of that annular orifice. The radial gap between surfaces 54 and 56 may be less than five ten-thousandths of an inch so highly accurate centering is required if the fuel flow is to be evenly distributed around the circumference of the annular orifice.

The direction of flow from this annular orifice can be controlled as a function of valve lift by shaping the approaches 57 and 58 to the inner and outer cylinder boundaries 54 and 56 of the annular orifice as is well understood by those experienced in the fuel injection art.

The lift of the check valve must be limited to prevent abuse of the spring by repeatedly compressing it solid and to match the wide open discharge restriction of all individual valves used as sets on multi-cylinder engines. Spring pilot ring 51 has a stop face 59 a selectable height "h" from spring free end 40 on retainer 46. Height "h" can be selected to control lift distance "l" through which the valve member and retainer can move before face 59 hits stop 61 of valve body 23. To enable pin 42 to be assembled into pin opening 41, end 62 of valve body 23 must not be in a plane that would cover any of the pin opening when the check valve is seated. This limits the overall length of the valve body as does also the need to provide fuel flow space 52.

A completely enclosed and sealed fuel injection valve has marked advantages as a service replacement item. Holder 21 is attached to seat 23 by rotary friction welding at zone 63. Pilot diameters 64 and 66 guide the parts during rotation of one relative to the other. A strainer disk 67 is supported by perforated plate 68 within pilot cylinder 66 and both of them are held against an inside shoulder 69 in holder 21 by a spring washer 71. FIG. 4 shows the spring washer in a plan view. Before assembly the outer diameter 72 of the washer is greater than cylindrical pilot bore 66 of holder 21 and gap 73 is wide as for an internal snap ring. Ring 71 is fabricated of flat spring sheet material into a wavy or corrugated profile as shown in FIG. 5 so that its overall thickness, unassembled, is several times greater than thickness of the material and greater than the space between the strainer support plate 68 and valve body end 62 after final friction welding together of holder 21 and seat 23.

FIG. 6 shows pin 42' bearing directly on retainer 46' as an alternate construction. On one side of pin 42' are an aligned pair of identical cut-out flats 74 leaving between them a portion 75 in which the pin is of full diameter. Portion 75 is short enough to fit within the central opening through retainer 46', which opening is defined by flat side walls 76'. Such flats provide ample bearing area between pin 42' and retainer 46' and serve to assure that the pin 42' will stay in assembled axial position. Retainer 46' has a flat bottomed rectangular slot between abutments 77. This slot extends across the full diameter of retainer 46 and is centered on an axis which intersects the retainer axis. This slot is just wide enough for pin 42' to fit freely within and abutments 77 hold the pin centered on the retainer 46'. The end of retainer portion 38' of valve member 34' is formed as part of a sphere 47' with its radius centered on the axial center line of the valve member. Also flats 78 are formed at each end of the pin opening of the retainer portion 38' of valve member 34' and the flat side walls 76' of the opening in retainer 46' similarly are flat and parallel to reduce the width across which pin 42' must span as a load carrying beam.

FIGS. 7 and 8 show alternative constructions of outward opening fuel injection valves incorporating conventional spiral edge type filter plugs 79 in enlarged high pressure supply passages 80 in holders 21' and 81. All enclose the seat valve spring and retainer assembly in an orifice cup. As shown in FIG. 7, the valve body 82 has a conical seat surface 32' with its largest diameter opening at body end 33'. Most of the outer length of body 82 is of slender cylindrical shape 83 fitting closely but without interference in an inner chamber in orifice cup 84. The retainer assembly includes pin 42' with flats 74 bearing on retainer 46'. However, no movement limiting stop is necessary at the retainer as orifice cup 84 performs that function. Orifice cup 84 is friction welded to holder 21' in zone 63'.

The head portion of valve member 91 is extended within pocket 92 of cup 84 to include cylindrically arranged guide surfaces 93 and tip portion 94. Two or more longitudinal flats or grooves 95 symmetrically spaced between guide surfaces 93 provide channels for fuel flow. The guide surfaces 93 are precision fitted in cylindrical surface 96 of orifice cup 84 but are free to move axially therein. A sealing cylindrical skirt 97 on tip portion 94 is also precision fitted to cylindrical surface 96. The inner end of orifice cup 84 defines a tip sac chamber 98 of larger diameter than cylindrical surface 96. Orifice cup 84 has orifices 99 therethrough.

The outward opening fuel injection valve shown in FIG. 8 has a single short orifice 103 in orifice cup 84'. Check valve head portion 36" is free floating when unseated. Orifice cup 84' defines a valve head pocket 92'.

The greatest forces imposed on valve 34" are limited in such a nozzle as pressure flowing around the valve head portion and to the orifice in the valve pocket result in partially counterbalancing forces on the valve. This makes acceptable the stress levels in a fully cylindrical pin 42 in only line-contact with retainer 46". Retainer 46" includes outer cylindrical surface or ring 48" and spring piloting ring 51" to retain the pin in axially centered position.

FIG. 9 schematically shows a fixture 144 in which the valve body 23 (or bodies 82 or 82' of FIGS. 7 and 8) is positioned and tightly held by hollow screw 146. Check valve member 34 is held against its seat in body 23 by a load rod 147 on positioning screw 148. The positioning screw is movable axially within screw 146. A predetermined assembled load force is applied to the free end of spring 29 by loading face 149 of a loading weight 151. Part of this weight are the attached masses of a pair of linear position sensing pick-ups. First measuring means 152, forming a part of one of the pick-ups, measures the linear distance perpendicularly from the loading face 149 to the inner surface of the pin opening 41 on the center line of check valve 34. This first total distance ("Z" on FIGS. 3 and 6) or the deviation from a standard distance, is made known at remote read-out 153. A combination of thicknesses of the selectable members of the retainer means is selected which has a total thickness equal to the thickness so measured and those parts assembled after removal of the subassembly of seat, valve, and spring from the fixture.

For fuel injection valves having a lift stop at the retainer, a second measuring means 154 (forming a part of the second pick-up) measures the linear distance perpendicularly from loading face 149 to lift stop 61. This second total distance, or deviation from a standard distance, is made known at remote read-out 156. With only the assembled load force applied, the second measuring means 154 and 156 measure the check seated distance ("m" on FIGS. 3 and 6) or the deviation of that distance from a standard distance.

A system for pumping some selected calibration fluid through each fuel injection valve sub-assembly includes a storage tank 157, a pump 158 capable of delivering an adequate continuous flow of fluid at high pressures and sufficiently free of pulsations to provide the desired degree of accuracy of flow measurement by meter 159 and pressure-drop measurement by gauge 161. Motor drive means M drives pump 158 on demand and may be adjustable in speed of drive. Pressure level and flow can be varied by setting of by-pass valve 162, by adjustment of pump speed, or a combination of the two. Test fluid flow rate is made known at read-out 163. Weight 151 is enclosed in a tight pressure vessel 164 of fixture 144 into which the fluid flows from line 166. Flow of the fluid out of seat 23 is collected within holding screw 146 and drained through outlet 169 into tank 157. Such filtering, monitoring, and density regulating devices as may be required to maintain constant the properties of the test fluid can be included in the system but are not shown.

Valve 34 is lowered from contact with seat 23 by positioning screw 148. Simultaneously spring load face 149 is moved and identical amount by spring loading screw 167 through spring loading rod 168 in contact with weight 151. The movements of the valve and loaded end of the spring are kept identical by monitoring first measured distance "Z" at read-out 153 and keeping it unchanged during such movements. With valve 34 unseated, flow of calibration fluid through the fixture is started. Flow is restricted by the limited flow clearances between head portion 36 and the seat in body 23 so that the pressure drop indicated by gauge 161 will vary both with flow rate 163 and flow restriction area which varies with valve position as well as with such variations in certain actual dimensions of valve or seat as are unavoidable in their manufacture.

The axial position of valve member 34 is adjusted until a position is found at which pressure drop 161 and flow rate 163 are at predetermined levels specified for the fuel injection valve assembly at maximum lift. At this position of the valve member and spring load face, the retainer stop ring height ("h" In FIGS. 3 and 6), or a deviation of that height from a standard, is measured by second measuring means 154 and 156. A retainer is then selected which has a stop ring of the height just measured for assembly after the tested sub-assembly has been removed from the fixture.

As an attractive alternative method for standardizing injection valve flow at maximum lift, valve member 34 and spring face 149 are simultaneously moved axially by the means and in the manner described in the foregoing. Added are valve force measuring means 171 connected to read-out means 172 and spring loading force measuring means 173 connected to read-out means 174. A differential force read-out means 176 may be included for convenience in finding that position of valve member 34 and spring face 149 (with first read-out 153 held at the setting found for correct assembled spring load) at which the valve force 171 and 172 equals spring force 173 and 174 plus the force of weight 151 as shown by a differential force read-out 176 equal to the weight force, and all this with flow rate at the predetermined specified level, read-out 163. Pressure drop read-out 161 is monitored and determined to be within an accepable range. At this position of the valve member 34 and spring load face 149, the retainer stop ring height is measured using measuring means 154 and 156 and a retainer means with a stop ring of the height just measured is selected. By this process of calibration a stop position is determined and provided in the completely assembled fuel injection valve at which spring force and valve force are identical, as they will be in any assembled valve until the stop is actually contacted by the retainer. Flow rates of valves so calibrated will be identical.

I claim:

1. A fixture for use in assembling a fuel injection valve for an internal combustion engine, which valve comprises a body having two ends and an axis, a cylindrical chamber in one end and a valve seating surface near the other end, a compression spring and a valve member mounted within said body, said spring having two ends, said valve member having a head end portion and a retainer end portion, said head portion having a surface proportioned to fit in sealing relationship on the seating surface of said body, retainer means positioned to provide load carrying connection between said spring and the retainer portion in said valve member and including a pin, said retainer portion having a pin opening transverse to said axis with an internal side at said opening against which internal side the pin normally bears, said retainer means having at least one member having a selectable thickness dimension parallel to said axis, said fixture comprising:

means for holding said body, means for positioning said valve member axially into sealing relationship within said body, spring loading means having a loading face in a plane perpendicular to said axis and applying a specified assembled load to said spring, means for measuring the greatest distance between the plane of said loading face and said internal side, said distance being measured on said axis, whereby the assembler may select for assembly a combination of selectable thickness dimensions of said retaining means members so as to have a thickness dimension total equal to the greatest distance measured.

2. The combination of a fuel injection valve for an internal combustion engine and a fixture for use in assembling said valve, said valve comprising:

a body having two ends and an axis, a cylindrical chamber in one end and a valve seating surface near the other end, a compression spring and a valve member mounted within said body, said spring having two ends, said valve member having a head end portion and a retainer end portion, said head portion having a surface proportioned to fit in sealing relationship on the seating surface of said body, retainer means positioned to provide load carrying connection between said spring and the retainer portion in said valve member and including a pin, said retainer portion having a pin opening transverse to said axis with an internal side at said opening against which internal side the pin normally bears, said retainer means having at least one member having a selectable thickness dimension parallel to said axis;

said fixture comprising:

means for holding said body, means for positioning said valve member axially into sealing relationship within said body, spring loading means having a loading face in a plane perpendicular to said axis and applying a specified assembled load to said spring, means to measure the greatest distance between the plane of said loading face and said internal side, said distance being measured on said axis; whereby the assembler may select for assembly a combination of selectable thickness dimensions of said retaining means members so as to have a thickness dimension total equal to the greatest distance measured.

3. The combination as set forth in claim 2, wherein said retainer means includes spring abutment means having two parallel sides separated by a selectable thickness dimension, said pin having a cylindrical surface with a diameter smaller than the pin opening of said valve member, said pin diameter also being a selectable thickness dimension.

4. The combination as set forth in claim 3, wherein said abutment means comprises a spring retainer and a collar, said spring retainer and collar both being symmetrical about said axis with two parallel sides perpendicular thereto, said collar member having a pair of aligned cylindrical pin openings therethrough parallel to said collar sides, said collar being a member with selectable thickness dimensions, they being the minimum thickness dimensions between the cylindrical surface of its pin openings and each side of said collar.

5. The combination as set forth in claim 4 including sealing means in said fixture at both ends of said body, high pressure flow test means communicating with both ends of said body for passing a calibration fluid through said body, said flow test means having flow rate and pressure drop measuring means, axially adjustable valve member support means, axially adjustable auxiliary spring compressing means, and second measuring means within said fixture means to measure the distance between the plane of said spring loading face and the stop shoulder surface of said body with the valve means positioned away from seating position in the body means so as to have a specified minimum restriction to flow through said body of said calibration fluid.

6. The combination as set forth in claim 2, wherein said pin has two ends, a longitudinal axis and a cylindrical surface intermediate two identical flats, one of such flats starting from each end of said pin and both flats being in the same plane, said pin having a selectable thickness measured perpendicularly from said flats through the axis of said pin to the cylindrical surface opposite said flats.

7. The combination as set forth in claim 2 including sealing means in said fixture at both ends of said body, high pressure flow test means communicating with both ends of said body for passing a calibration fluid through said body, said flow test means having flow rate and pressure drop measuring means, axially adjustable valve member support means, axially adjustable auxiliary spring compressing means, and second measuring means within said fixture means to measure the distance between the plane of said spring loading face and the stop shoulder surface of said body with the valve means positioned away from seating position in the body means so as to have a specified minimum restriction to flow through said body of said calibration fluid.

8. The combination as set forth in claim 7 including: means for measuring the differential between the force exerted against said valve support member by said valve and the force applied to said spring loading face by the auxiliary spring compressing means so as to have a specified flow rate of calibration fluid through said body at a specified differential force.

9. A method of using the combination as set forth in claim 2 for assembling said injection valve comprising the steps of:
  positioning a subassembly comprising said body, spring and valve member in said fixture with valve member supported in seated position,
  applying a specified assembled load to said spring by said spring loading means,
  measuring the distance between the plane of said loading face and said internal side, and
  selecting for assembly into said valve a combination of said retaining means members so as to have a thickness dimension equal to said distance measured.

10. A method of using the combination set forth in claim 7 for calibrating said injection valve comprising the steps of:
  positioning a subassembly comprising said body, spring and valve member in said fixture with valve member supported in seated position,
  applying a specified assembled load to said spring by said spring loading means,
  using the first mentioned measuring means to measure and monitor the distance between the plane of said loading face and said internal side of said pin opening,
  repositioning said valve member axially away from said seat surface by adjusting said valve support means,
  simultaneously increasing the load on the spring by adjusting the auxiliary spring compressing means to move the load face the same distance as the valve member is moved by maintaining the reading of the first mentioned measuring means constant,
  activating a flow of said calibration fluid through said valve body,
  continuing simultaneous repositioning of said valve member and load face until a position of said valve member is found at which said calibration fluid flows at a specified rate with a specified pressure drop, and
  using the second mentioned measuring means to measure the stop ring height to be employed on said retainer means.

11. A method of using the combination set forth in claim 8 for calibrating said fuel injection valve comprising the steps of:
  positioning a subassembly comprising said body, spring and valve member in said fixture with valve member supported in seated position,
  applying a specified assembled load to said spring by said spring loading means,
  using the first mentioned measuring means to measure and monitor the distance between the plane of said loading face and said internal side of said pin opening,
  repositioning said valve member axially away from said seat surface by adjusting said valve support means,
  simultaneously increasing the load on the spring by adjusting the auxiliary spring compressing means to move the load face the same distance as the valve member is moved by maintaning the reading of the first mentioned measuring means constant,
  activating a flow of said calibration fluid through said valve body,
  continuing simultaneous repositioning of said valve member and the spring loading face until a position is found at which said calibration fluid flows at a specified rate and also produces a specified differential force measurement, and
  using the second mentioned measuring means to measure the stop ring height to be employed on said retainer means.

UNITED STATES PATENT AND TRADEMARK OFFICE
CERTIFICATE OF CORRECTION

PATENT NO. : 4,152,932

DATED : May 8, 1979

INVENTOR(S) : Lloyd E. Johnson

It is certified that error appears in the above—identified patent and that said Letters Patent are hereby corrected as shown below:

```
Column 1, line 53, delete "A" and starting as a paragraph
insert --In general the invention relates to a--.
Column 1, line 61, delete "applicable", second occurrence.
Column 6, line 49, "and" should read --an--.
Column 6, line 68, "In" should read --in--.
Column 7, line 22, "accepable" should read --acceptable--.
Column 8, line 27, "whereby" should start a main paragraph.
```

Signed and Sealed this

Second Day of October 1979

[SEAL]

Attest:

RUTH C. MASON
Attesting Officer

LUTRELLE F. PARKER
Acting Commissioner of Patents and Trademarks